United States Patent [19]
Kawamura

[11] Patent Number: 5,907,720
[45] Date of Patent: May 25, 1999

[54] LENS-FITTED PHOTO FILM UNIT

[75] Inventor: Fuminori Kawamura, Kanagawa, Japan

[73] Assignee: Fuji Photo Film Co., Ltd., Kanagawa, Japan

[21] Appl. No.: 08/982,644

[22] Filed: Dec. 2, 1997

[30] Foreign Application Priority Data

Dec. 6, 1996 [JP] Japan ..... 8-326788

[51] Int. Cl.$^6$ ..... G03B 17/24
[52] U.S. Cl. ..... 396/6; 396/529; 396/535
[58] Field of Search ..... 396/6, 529, 535

[56] References Cited

U.S. PATENT DOCUMENTS 5,659,803  8/1997  Takagi et al. ..... 396/6

Primary Examiner—David M. Gray
Attorney, Agent, or Firm—Young & Thompson

[57] ABSTRACT

In a lens-fitted photo film unit having a main body portion containing a roll of unexposed photo filmstrip and having photographic mechanisms mounted thereto, and outer walls covering the main body portion, any clearance provided for relative movement between two adjacent members is made to be not less than any gap in outer walls of the film unit. Particle diameters of the sands, which may enter at any gap in the outer wall, are less than the gap and thus less than any clearance, so that the clearance is not clogged up with the sands.

1 Claim, 6 Drawing Sheets

LENS-FITTED PHOTO FILM UNIT

BACKGROUND OF THE INVENTION

1. Field of the Invention

The present invention relates to a lens-fitted photo film unit containing a roll of unexposed photo filmstrip and having simple photographic mechanisms. More particularly, the present invention relates to a preventive measure against malfunction of the photographic mechanisms of the lens-fitted photo film unit that is caused by particles or sand coming in the unit body.

2. Background Arts

Lens-fitted photo film units have been known as a devices available at a reasonable price which allow anyone to enjoy photography with ease anytime and anywhere without the need for loading film. The lens-fitted photo film unit, hereinafter referred to as the film unit, is constituted of a main body portion and outer walls covering the main body portion. The main body portion contains a roll of unexposed photo filmstrip and a cartridge shell for winding up the filmstrip one frame after each exposure. A taking lens and photographic mechanisms, such as a shutter mechanism and a film winding mechanism, are mounted to the main body portion.

The outer walls are provided with openings for exposing the taking lens, a film winding wheel and other necessary members. The outer walls also have slits for forming resilient operation members for actuating the photographic mechanisms, such as a shutter button, and for other purposes.

When the film unit is used in sandy or dusty locations, e.g. a beach or a construction site, sand or other particles may come in through the openings and slits of the outer walls, and sometimes hinder the operation of the mechanisms. Specifically, when the shutter blade is clogged with the sands, the film unit cannot work anymore.

SUMMARY OF THE INVENTION

In view of the foregoing, a prime object of the present invention is to provide a film unit which works well even if sand or other particles enter the unit body.

According to the present invention, in a film unit having a main body portion and outer walls covering the main body portion, any clearance provided for relative movement between two adjacent members is made to be not less than any gap in outer walls of the film unit.

Even if sand enters at any gap in the outer wall, the particle diameters of the grains of sand are always less than the width of the gap and thus less than any clearance, so that the clearance is not clogged up with the sand.

To prevent particles from entering through a lens aperture that is formed through a front wall, a ring-like protection rim is formed on a rear side of the front wall around the lens aperture. The protection rim comes into tight contact with a front surface of a lens fastener that fastens the taking lens to a front position of the main body portion. A protection ridge is also formed on the rear side of the front wall around the protection rim to surround the periphery of the lens fastener.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
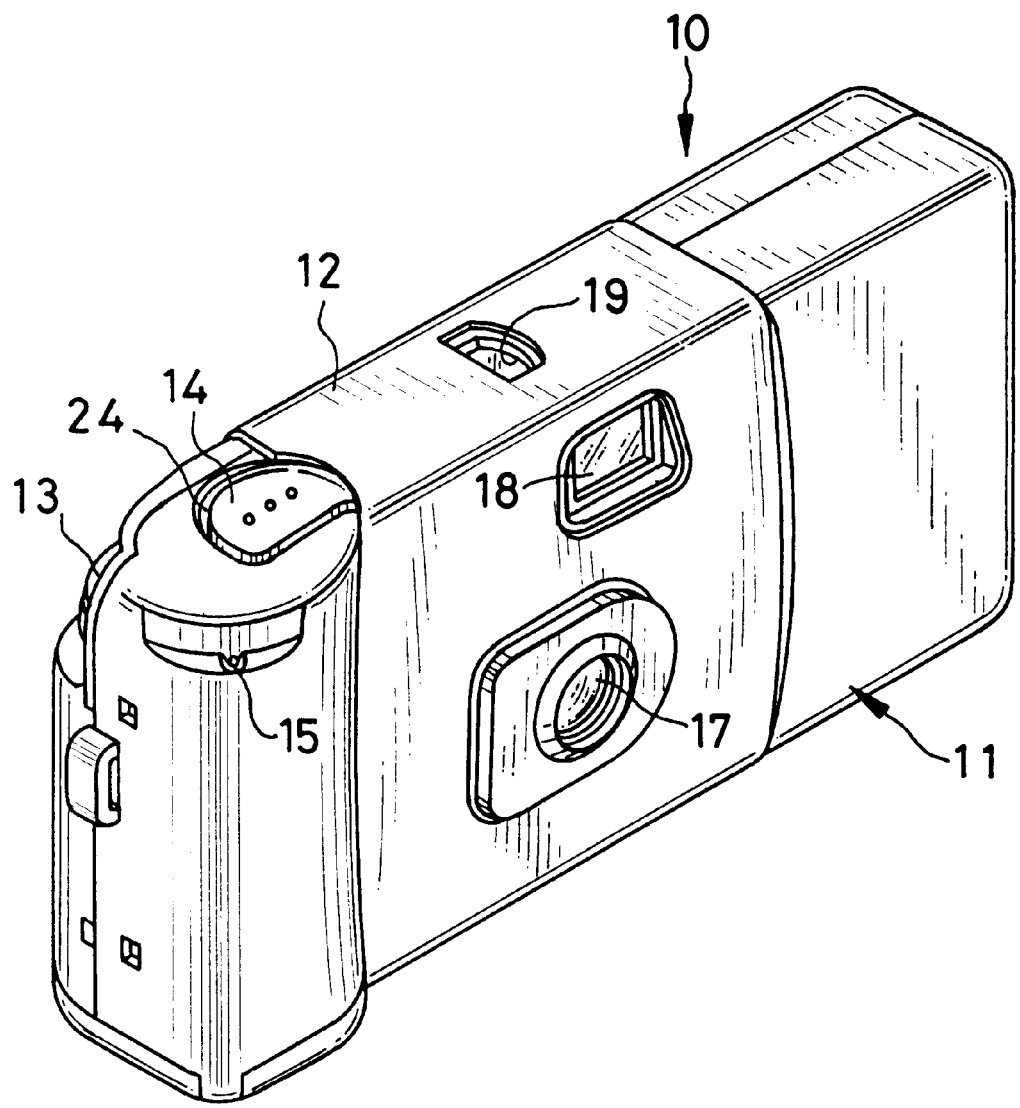
FIG. 1 is a perspective view of a film unit according to an embodiment of the invention.

A film unit 10 has a unit body 11 which is wrapped with a label 12 in the middle thereof. The label 12 does not extend over a film winding wheel 13, a shutter button 14, a film wind-up indicator hole 15, and has openings for exposing a taking lens 17, finder windows 18, a frame counter window 19 and other parts to be exposed to the outside.

Figure 2:
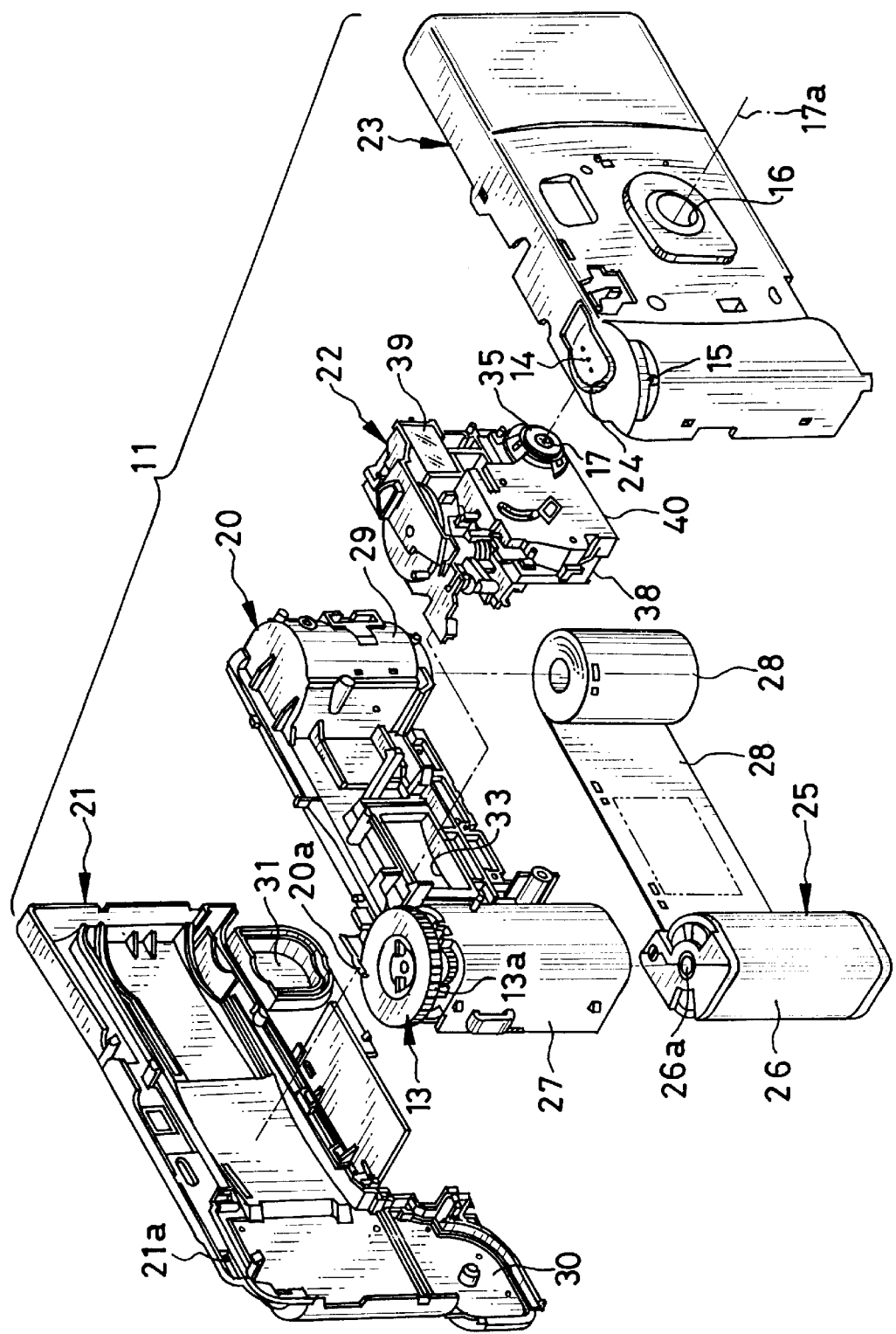
FIG. 2 is an exploded perspective view of the film unit shown in FIG. 1.

As shown in FIG. 2, the unit body 11 consists of a main body portion 20, a rear cover 21, an exposure unit 22, a front cover 23, and a film cartridge 25.

The front cover 23 is attached to the front of the main body portion 20 through snap-in engagement members, to cover front and top sides of the exposure unit 22. The shutter button 14 is formed integrally with the top wall of the front cover 23 through a U-shaped slit 24. The shutter button 14 can be resiliently pushed down because the front cover is made of a resilient plastic. The width of the slit 24 is designed to be 0.5 mm or less so as to prevent larger particles or grains of sands from coming into the unit body 11 through the slit 24. Although the slit 24 or the gap around the shutter button 14 gets wider when the shutter button 14 is depressed, the size of the shutter button 14 is so small that the forefinger depressing the shutter button 14 usually covers the slit 24 too. Therefore, particles of more than 0.5 mm hardly enter at the slit 24.

Figure 3:
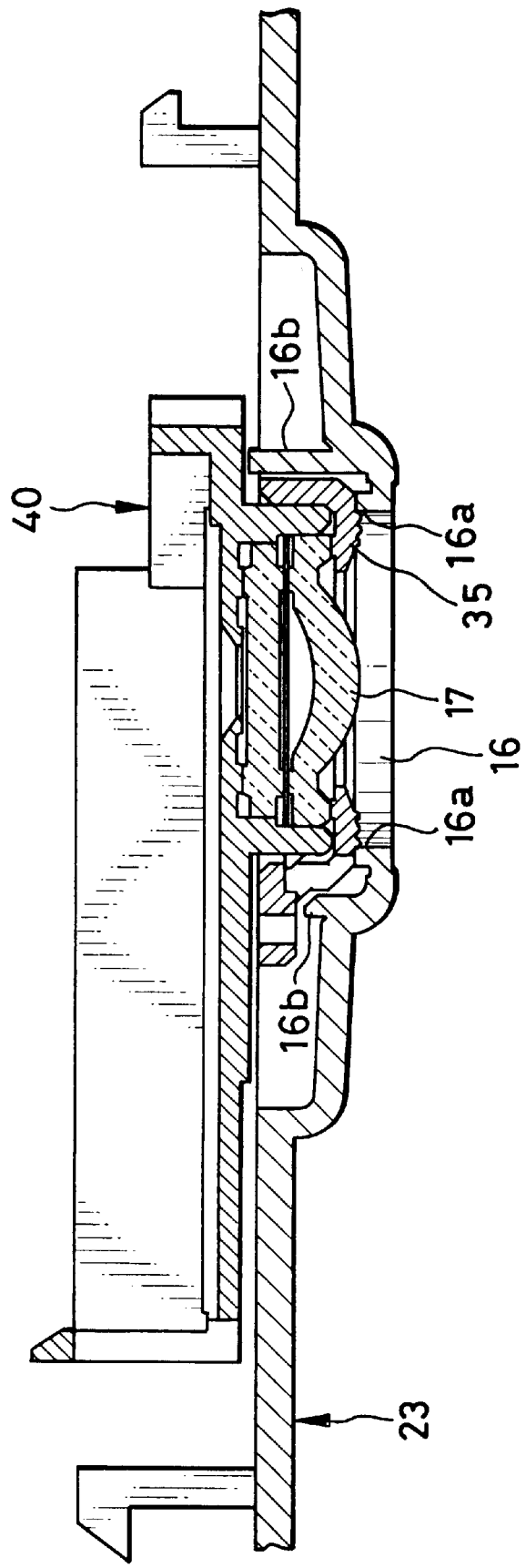
FIG. 3 is a fragmentary section of the film unit, illustrating a portion around its lens aperture.

The front cover 23 also has a lens aperture 16 in its center front portion, for exposing the taking lens 17 to the outside. As shown in FIG. 3, the lens aperture 16 is formed with a protection rim 16a protruding inward toward the exposure unit 22, so the rim 16a is in tight contact with a front surface of a lens fastener 35 of the exposure unit 22. In addition, a ring-like protection ridge 16b is formed around the protection rim 16a on the inside surface of the front cover 23 to as to surround the lens fastener 35. The protection rim 16a and the protection ridge 16b prevent particles and grains of sand from coming into the unit body 11 through the lens aperture 16.

The main body portion 20 has a cartridge chamber 27 and a film roll chamber 29 on opposite sides of an exposure aperture 33. The cartridge chamber 27 holds a cartridge shell 26 of the film cartridge 25 therein, and the film roll chamber 29 holds an unexposed filmstrip 28 that is withdrawn from the cartridge shell 26 and is coiled into a roll 28a. The chambers 27 and 29 have open bottoms which are closed by bottom lids 30 and 31 in a light-tight fashion after the film cartridge 25 is loaded. The bottom lids 30 and 31 are formed integrally with the rear cover 21.

The film winding wheel 13 is mounted to be rotatable on atop the cartridge chamber 27. The film winding wheel 13 has a shaft that is engaged with a spool 26a of the cartridge shell 26. The film winding wheel 13 is partly exposed to the outside of the unit body 11 through a wheel slot 21a of the rear cover 21, so as to permit rotating the film winding wheel 13. By rotating the film winding wheel 13 in a winding direction, the spool 26a rotates to wind up the filmstrip 28 into the cartridge shell 26. Also the gap between the wheel slot 21a and the film winding wheel 13 is designed to be not more than 0.5 mm, thereby to screen out particles whose diameter is more than 0.5 mm. The film winding wheel 13 has a ratchet 13a around its periphery, and a pawl 20a stops the film winding wheel 13 from rotating in an unwinding direction.

The exposure unit 22 is an assembly having various members mounted on a base frame 38. In addition to a shutter mechanism for actuating the shutter blade 14, a viewfinder 39 is mounted on the top of the base frame 38. A lens holder 40 for holding the taking lens 17 is mounted to the front of the base frame 38. A shutter blade cavity 44 is formed in between the base frame 38 and the lens holder 40, as is shown in FIGS. 4A and 4B. A shutter blade 42 can swing about a pivot 43 inside the shutter blade cavity 44 in a plane perpendicular to an optical axis 17a of the taking lens 17.

Along the course of the shutter blade 42, rails 45 and 46 are formed on a front surface 38a of the base frame 38, and rails 47 and 48 are formed on a rear surface 40a of the lens holder 40. The height L1 of the rails 45 and 46 is defined such that the rails 45 and 46 provide a clearance D1 between the front surface 38a of the base frame 38 and the shutter blade 42, that is not less than the width of the slit 24 or the gap between the film winding wheel 13 and the wheel slot 21a. Also, the height L2 of the rails 47 and 48 is defined such that the rails 47 and 48 provide a clearance D2 between the rear surface 40a of the lens holder 40 and the shutter blade 42 that is not less than the width of the slit 24 or the gap between the film winding wheel 13 and the wheel slot 21a. As the shutter blade 42 slides on the rail 45 and 46, the clearance D1 is equal to the height L1. For instance, L1=0.50 mm and L2=0.55 mm when the width of the slit 24 and the gap between the film winding wheel 13 and the wheel slot 21a are 0.5 mm.

Figure 4:
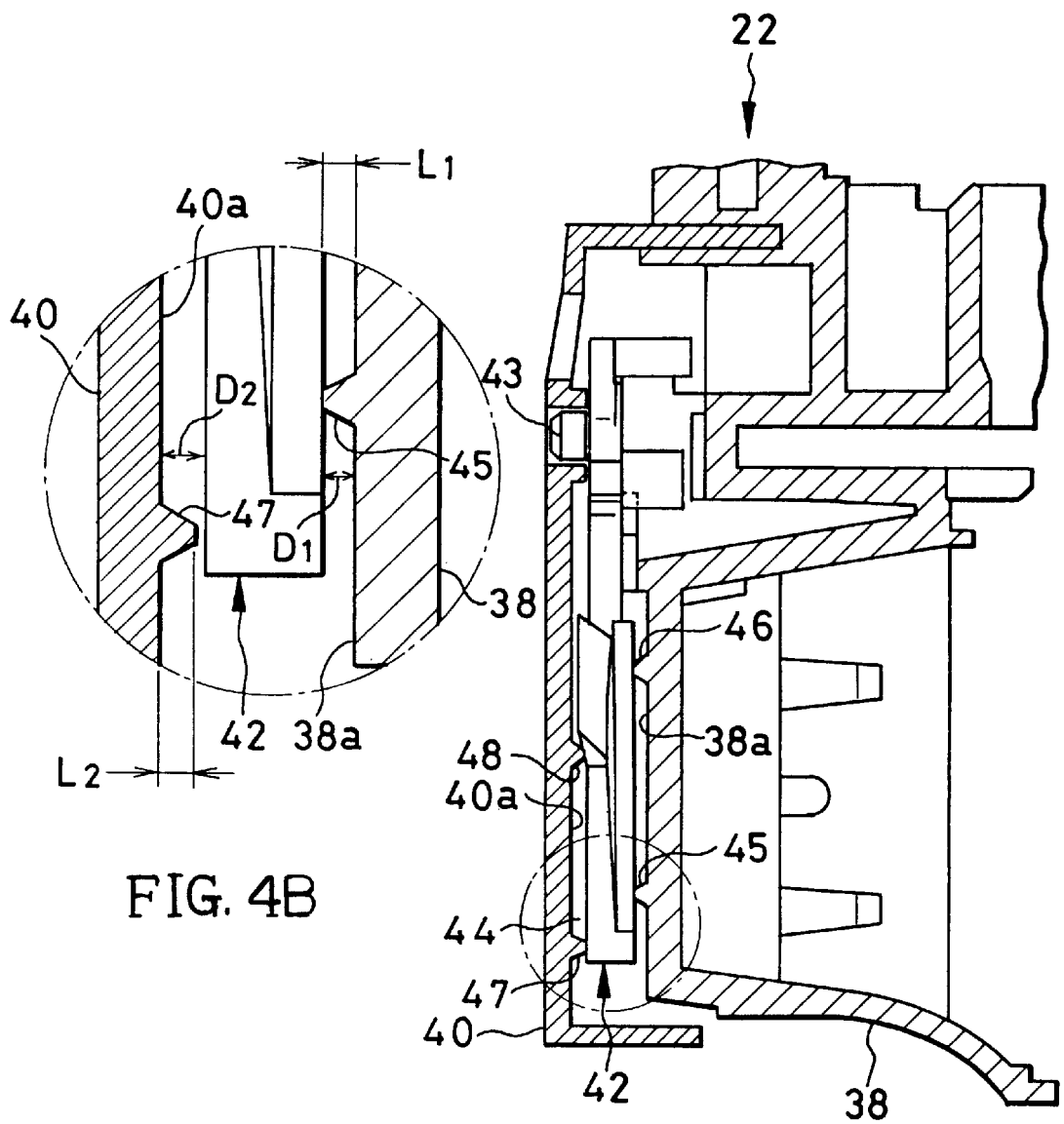
FIGS. 4A and 4B are fragmentary section of an exposure unit of the film unit, illustrating a shutter blade cavity.

According to this configuration, even if any particles come into the shutter blade cavity 44, the diameters of the particles are always less than the clearances D1 and D2, so that the clearance D1 or D2 would not be clogged with the particles. Thus, the particles do not hinder the operation of the shutter blade 42. To prevent the particles from settling on the rails 45 to 48, the rails 45 to 48 are tapered to have a trapezoid lateral section, as shown in FIG. 4. Of course, the rails 45 to 48 may have a triangular lateral section or a rounded top surface.

Figure 5:
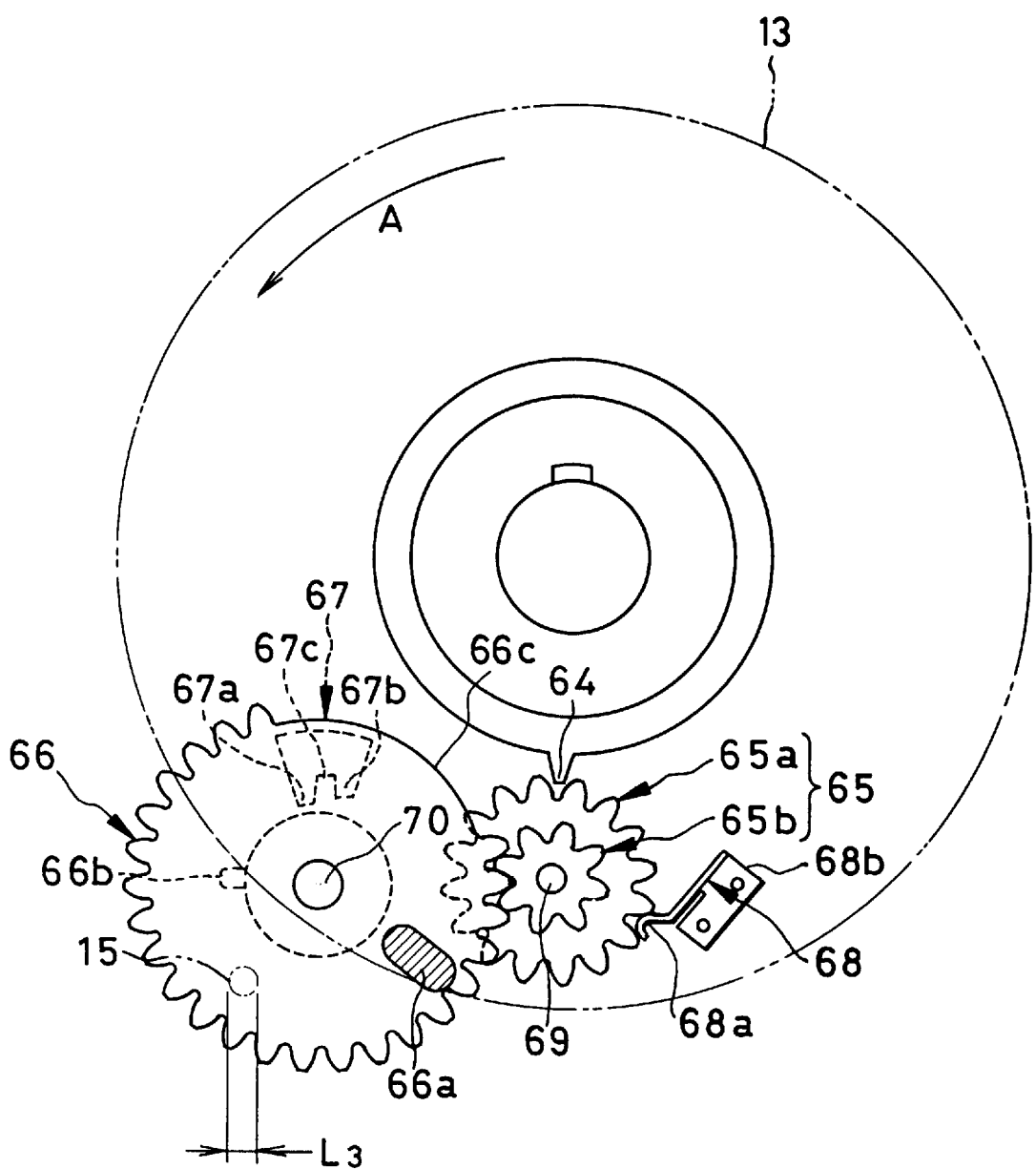
FIG. 5 is a schematic view of a film winding mechanism of the film unit.

Referring to FIG. 5, the film winding wheel 13 has a one-tooth gear 64 formed integrally on its bottom surface. The one-tooth gear 64, a reduction gear 65, an indication gear 66, a locking member 67 and a leaf spring 68 constitute a film wind-up indication mechanism for indicating to the outside of the film unit 10 that the filmstrip 28 is entirely wound up into the cartridge shell 26. The reduction gear 65 and the indication gear 66 are pivotal about axles 69 and 70 which are integrally formed on the cartridge chamber 27. The one-tooth gear 64 rotates together with the film winding wheel 13 in the winding direction that is indicated by an arrow A in FIG. 5.

The reduction gear 65 consists of a pair of coaxial gears 65a and 65b of larger and smaller diameters. The larger gear 65a is engaged with the one-tooth gear 64 once while the one-tooth gear 64 makes one rotation to wind up the filmstrip 28 by one frame. The one-tooth gear 64 causes the larger gear 65a to rotate by a given angle at one time. The smaller gear 65b is interlocked with the indication gear 66. Each time the larger gear 65a rotates by the given angle, the indication gear 66 is rotated by a smaller angle than the given angle in accordance with the reduction ratio of the reduction gear 65.

The indication gear 66 is provided with an indicia 66a on its top surface. When the film winding wheel 13 has been rotated to wind up the entire length of the filmstrip 28 into the cartridge shell 26, the indicia 66a is positioned behind the film wind-up indicator hole 15, so that the indicia 66a is viewed from outside the film unit 10.

When the indication gear 66 comes to the position for displaying the indicia 66a through the indicator hole 15, a radial protuberance 66b formed on the bottom side of the indication gear 66 is caught in the locking member 67 that is formed on the top of the cartridge chamber 27. The locking member 67 has a pair of projections 67a and 67b and a radial recess 67c formed between the projections 67a and 67b. The projection 67b on the side to accept the protuberance 66b is shorter than the other projection 67a. The axle 70 is made of a resilient material, so the axle 70 is slightly bent when the protuberance 66b gets over the projection 67b. Thus, the protuberance 66b snaps into the recess 67c as the indicia 66a is positioned behind the indicator hole 15. It is alternatively possible to make the projection 67b flexible to allow the protuberance 66b to get over it.

To disengage the indication gear 66 from the smaller gear 65b after the indicia 66a is positioned behind the indicator hole 15, the indication gear 66 has a toothless peripheral portion 66c over an angular range, which is opposed to the smaller gear 65b when the indication gear 66 rotates to the position to display the indicia 66a through the indicator hole 15.

Figure 6:
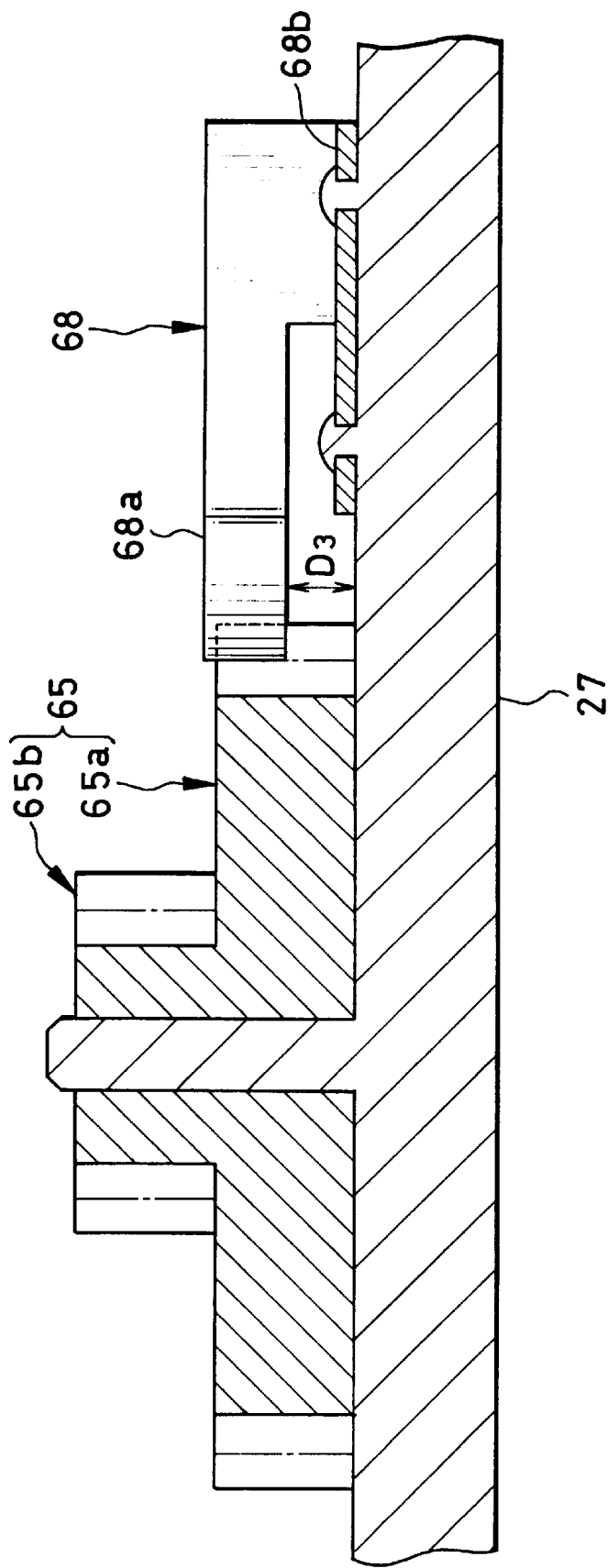
FIG. 6 is a fragmentary section of the film winding mechanism of FIG. 5.

An end 68a of the leaf spring 68 serves as a click for the larger gear 65a to rotate stably while the one-tooth gear 64 is not engaged with the larger gear 65a. As shown in FIG. 6, the end 68a of the leaf spring 68 is spaced by a distance D3 from the top of the cartridge chamber 27, whereas the other end 68b of the leaf spring 68 is secured to the top of the cartridge chamber 27. The distance D3 is defined to be more than the internal diameter 13 of the indicator hole 15. For example, L3=0.30 mm and D3=0.50 mm. Thus, if any particles enter at the indicator hole 15, the particles are smaller than the distance D3, so that the function of the leaf spring 68 as the click for the larger gear 65a would not be clogged with the particles.

The film unit 10 having the above construction operates as follows:

First, the photographer rotates the film winding wheel 13 in the winding direction A, so far as the film winding wheel 13 can rotates, then a first frame of the filmstrip 28, that is the nearest frame to the cartridge shell 26, is positioned behind the exposure aperture 33. Simultaneously, the shutter mechanism is charged.

When the shutter button 14 is depressed, the shutter mechanism is released to swing the shutter blade 42 behind the taking lens 17, to expose the frame behind the exposure aperture 33 to the light from the subject. After the shutter mechanism is released, the film winding wheel 13 is enabled to rotate to wind up the exposed frame of the filmstrip 28 into the cartridge shell 26. Each time the film winding wheel 13 makes one rotation, the filmstrip 28 is advanced by one frame, and the one-tooth gear 64 causes the larger gear 65a of the reduction gear 65 to rotate by the given angle. As a result, the smaller gear 65b causes the indication gear 66 to rotate by the given smaller angle.

After the all available frames are exposed, the film winding wheel 13 is allowed to rotate without stop. When the film winding wheel 13 rotates to wind up the entire length of the filmstrip 28 into the cartridge shell 26, the indication gear 66 rotates into the position where the indicia 66b is viewed through the indicator hole 15. In this position, the protuberance 66b snaps into the recess 67c of the locking member 67, stopping the indication gear 66 from further rotation. Simultaneously, the toothless portion 66c of the indication gear 66 is opposed to the smaller gear 65b, so the rotation of the film winding wheel 13 is not transmitted to the indication gear 66 any more.

Thereafter, the film unit 10 is forwarded to a photo finisher. The film cartridge 25 containing the exposed filmstrip 28 therein is removed from the unit body 10 for development and printing. The empty unit body 10 is collected by a specific recycling factory. The developed filmstrip 28 is rewound into the cartridge shell 26, and is returned to the user along with printed photographs.

Since the protection rim 16a and the protection ridge 16b are provided around the lens aperture 16 and the lens fastener 35 respectively, particles will never come into the unit body 11 through the lens aperture 16. Particles, which may enter at the slit 24 and the gap between the wheel slot 21a and the film winding wheel 13, would not stick in the clearance D1 or D2, since the clearances D1 and D2 on the opposite sides of the shutter blade 42 are not less than the slit 24 or the gap between the wheel slot 21a and the film winding wheel 13. Also particles, which may enter at the indicator hole 15, would not hinder the operation of the leaf spring 68, since the end 68a is spaced from the top surface of the cartridge chamber 27 by the distance D3 that is larger than the internal diameter L3 of the indicator hole 15. Accordingly, the film unit 10 operates well even in sandy locations.

The above embodiment and the numerical values cited in the above embodiment are not limitative of the present invention. Although the above embodiment refers to the slit around the shutter button and the gap between the film winding wheel and the wheel slot as portions at which particles or sands can come into the unit body, the present invention is directed to any slits and openings formed through the front and rear covers of the unit body and any clearances inside the unit body which are provided for enabling movement of some members. For example, a slit around a flash charge button concerning a film unit with a built-in flash. The configuration of the film winding mechanism, the shutter mechanism and other mechanism are not to be limited to the above embodiment.

Thus, various modifications may be possible to those skilled in the art without departing from the scope of claims attached hereto.

What is claimed is:

1. A lens-fitted photo film unit comprising:
   a main body portion containing a roll of unexposed filmstrip and holding a taking lens in a front position thereof;
   a front cover attached to a lens side of the main body portion;
   a ring-like lens fastener fitted in front of the taking lens for fastening the taking lens to the front position of the main body portion;
   a lens aperture disposed in the front cover to expose the taking lens;
   a protection rim disposed on a rear surface of the front cover and surrounding the lens aperture, the protection rim protruding rearward from the front cover to come into tight contact with a front surface of the lens fastener; and
   a ring-like protection ridge extending away from the rear surface of the front cover around the protection rim to surround the periphery of the lens fastener;
   wherein the protection rim and the ring-like protection ridge are designed to prevent the passage of particles from outside the unit to an interior of the unit around the taking lens.

* * * * *